G. W. DUNHAM.
LUBRICATING DEVICE FOR MOTOR TRANSMISSION MECHANISM.
APPLICATION FILED MAY 3, 1911.
1,145,007.
Patented July 6, 1915.
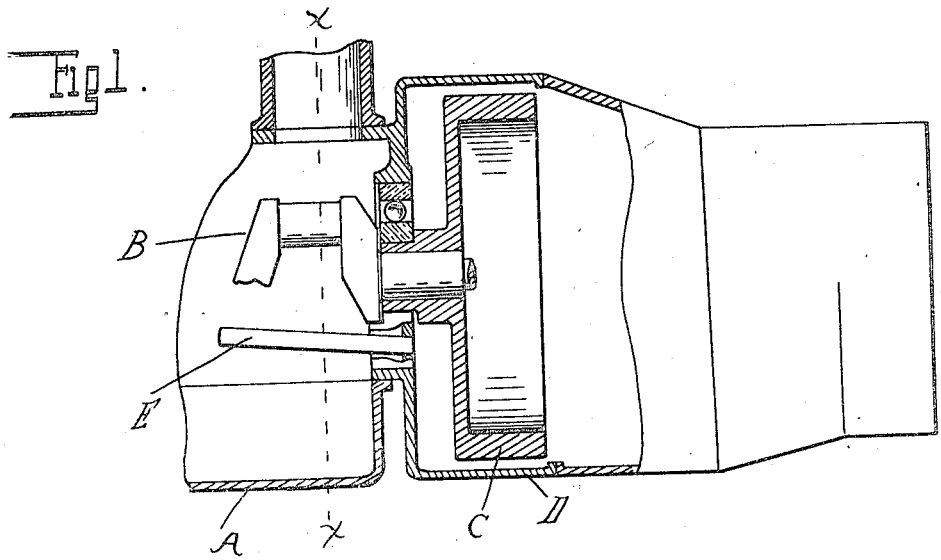
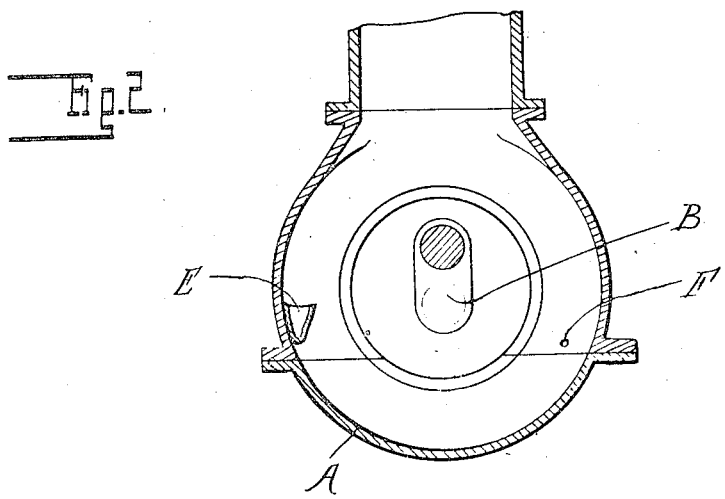
Witnesses
W. K. Ford
James P. Barry
Inventor
George W. Dunham
By Whittemore Hulbert & Whittemore
Atty's

UNITED STATES PATENT OFFICE.

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

LUBRICATING DEVICE FOR MOTOR TRANSMISSION MECHANISM.

1,145,007.

Specification of Letters Patent.

Patented July 6, 1915.

Application filed May 3, 1911. Serial No. 624,822.

*To all whom it may concern:*

Be it known that I, GEORGE W. DUNHAM, a citizen of the United States of America, residing at Detroit, in the county of Wayne and State of Michigan, have invented certain new and useful Improvements in Lubricating Devices for Motor Transmission Mechanism, of which the following is a specification, reference being had therein to the accompanying drawings.

The invention relates to motor transmission and more particularly to constructions designed for use on motor vehicles. In the standard constructions of mechanisms of this type it is usual to arrange the variable speed transmission in a housing adjacent to the motor crank case, and with certain constructions the fly-wheel and the main clutch for coupling the engine to the transmission, are also located in this housing. For lubricating the mechanism in the engine casing the splash system is usually employed, but various expedients have been used for maintaining the supply of lubricant in the transmission housing.

It is the object of the present invention to insure the maintenance of the lubricant in the transmission housing by utilizing the splash in the crank case for constantly feeding lubricant to said housing. This purpose is accomplished by the construction as hereinafter set forth.

In the drawings,—Figure 1 is a vertical longitudinal section through a portion of the crank case and the adjacent transmission housing; Fig. 2 is a cross section through the crank case housing on line x—x Fig. 1.

A is the crank case housing, B the crank therein, C the fly-wheel and D a housing for said fly-wheel and the transmission mechanism. Both the crank case and the housing are constructed to form therein splash chambers. The crank case A contains a suitable quantity of the lubricant which is maintained at a constant level by any suitable means of supply (not shown).

To supply the lubricant to the transmission housing, I arrange within the crank case at one side thereof, a pocket or receptacle E which receives lubricant splashed by the crank and drained down the sides of the case. This receptacle E is connected with the transmission housing so as to drain into the latter, and consequently whenever the engine is in motion there will be a constant feed of lubricant from the casing A to the casing D. The amount of this feed may be regulated by the size or extent of the receptacle E and when suitably proportioned the amount fed will be equal to the requirements. If however, a surplus is fed into the case D this may be returned into the case A by a drainage connection such as indicated at F.

What I claim as my invention is:

1. The combination with a crank-case and transmission housing and a partition between the same formed with upper and lower passages for lubricant, of means within the crank-case for receiving lubricant and conducting the same to the uppermost of said passages, and a crank-shaft extending through the crank-case having a bearing in said partition.

2. The combination with an engine crank-case and a transmission housing separated by a partition, of a crank-shaft having a bearing in said partition, a comparatively narrow receptacle extending along one of the crank-case walls and open to receive the splashed lubricant, said receptacle being disposed at a level above the bottom of the crank-case, and having a drainage connection through said partition to the transmission housing, the partition being orificed to permit return drainage from the transmission housing to the crank-case.

In testimony whereof I affix my signature in presence of two witnesses.

GEORGE W. DUNHAM.

Witnesses:
C. E. GREGORY,
RAY J. MAUER.